United States Patent [19]

Gray et al.

[11] Patent Number: 4,640,682

[45] Date of Patent: Feb. 3, 1987

[54] PULSE JET COMBUSTOR DEHYDRATION CONE CONSTRUCTION

[76] Inventors: Robert R. Gray, 110 Via Monte Mar Dr., Gladstone, Oreg. 97027; Thomas G. Lindahl, 7325 SW. Mallard Ct., Portland, Oreg. 97223

[21] Appl. No.: 783,858

[22] Filed: Oct. 3, 1985

[51] Int. Cl.[4] .......... F27B 15/00; B01D 1/16; B01F 15/06; F27D 7/00

[52] U.S. Cl. .......... 432/58; 110/243; 159/4.03; 366/144; 431/1; 432/25

[58] Field of Search .......... 432/13, 25, 58; 431/1; 110/243; 366/22, 23, 24, 144; 159/4.03

[56] References Cited

U.S. PATENT DOCUMENTS

| | | | |
|---|---|---|---|
| 2,673,081 | 3/1954 | Fay et al. | 432/13 |
| 2,838,869 | 6/1958 | Desbenoit et al. | 239/587 |
| 3,101,258 | 8/1963 | Johnson | 159/4.03 |
| 3,298,110 | 1/1967 | Kus et al. | 432/58 |

*Primary Examiner*—John J. Camby

[57] ABSTRACT

Improved dehydration section construction for pulse jet combustion apparatus for the drying of particulate materials that includes vibratable finger like sections at the downstream end thereof to minimize particle accumulationthereon.

5 Claims, 3 Drawing Figures

PULSE JET COMBUSTOR DEHYDRATION CONE CONSTRUCTION

This invention relates to the drying of particulate material and more particularly to improved methods and apparatus for the pulse combustion drying of particulate material.

BACKGROUND OF THE INVENTION

Pulse combustion drying, employing a pulse combustor essentially similar in nature to a pulse jet engine, is a relatively recent but recognized technique for effecting the drying of particulate materials. Illustrative of some earlier endeavors in pulse jet field for drying and other purposes are U.S. Pat. Nos. 3,618,655; 4,226,668; 4,266,670; 4,265,617 and 2,838,869. In the first of these patents a plurality of pulse jet engines are mounted at the base of a vertical chamber. A paste or slurry of the particulate material to be dried is introduced into the exhaust duct of such pulse jet engines which function to at least partially dry the particulate material and introduce it into the chamber where induced vortex gas flow causes circulation of the particulate material and consequent opportunity for further drying thereof. In the latter of these patents a linear pulse jet engine assembly for projecting various types of materials is disclosed.

A current state of the art pulse combustion dryer is made and sold by Sonodyne Industries of Portland, Oreg. The pulse combustor unit, which is the heart of the drying system, is a specially contoured and generally U-shaped hollow tube whose dimensions and materials of construction determine its operation. The pulse combustion process is initiated when air and fuel from a constant low pressure suppply thereof are drawn into the combustion chamber portion of the combustor and ignited by a spark. Hot gases created by the resulting detonation move in both directions from the combustion chamber. In one direction, they pass through an air conduit inlet and adjacent air augmenter, and in the other direction, through U-shaped exhaust section and past a raw material injection port at the downstream end thereof. Detonation in the combustion chamber causes the pressure therein to rise, momentarily shutting off the fuel supply. As the combustion chamber pressure falls following detonation, fuel is again admitted and mixed with air being drawn through the inlet conduit. Detonation occurs again, either because of contact between the explosive air-fuel mixture and the spark or by contact with the sufficiently hot wall of the chamber itself. Once the wall temperature reaches approximately 1800° F., the spark can be extinguished and the process becomes self-igniting.

The pressure fluctuation, which causes the pulsing behavior of the combustor, results in strong standing waves of sound energy which move in both directions from the chamber. Repeated detonations also create high speed displacement of hot gases with about 90% thereof exiting through the tailpipe and associated exhaust system components. Introduction of moisture laden particulate material into the downstream end of the exhaust section subjects such material to the sound waves which, although not fully understood, are believed to break the bonds between the solid particulate matter and the liquid, most often water, and in an atomization of the water into fine droplets with a consequent increase in surface area for evaporation. The heat present in the exhaust gas interacts with the atomized cloud of introduced raw material allowing highly efficient evaporation to occur. During drying, the rapid evaporation of the water absorbs most of the heat and the solid particulates are maintained and exit in a relatively cool state. It should be noted that while operating temperatures in the pulse combustion exhaust system exceed 2500° F., the residence time of the raw product solids in contact with the exhaust gases is very short, being in the order of a few milliseconds. Because of such short residence time and the high heat consumption effected by evaporation, the temperatures of the dried solid particulates rarely exceeds 100° to 150° F.

While pulse combustor drying apparatus of the type described immediately above has proved to be both efficient and economical in the drying of many diverse materials, certain problems have been encountered in the drying of particular materials. One such problem has been the undesired accumulation and build up of dried or partially dried particulates at the downstream end of the drying cone. Such accumulation, which appears sporadically but builds up rapidly when it occurs, seems to more frequently occur with materials of high alkalinity such as drilling mud, brewers yeast and certain resins.

SUMMARY OF THE INVENTION

This invention may be briefly described as an improved construction for pulse combustion drying apparatus and which includes, in the broad aspects, method and apparatus for effecting mechanical agitation of the portions of the downstream end of the side wall of the drying cone where undesired sticking of particulate material occurs. In its narrower aspects the subject invention includes the provision of replaceable vibratory sectios for the downstream end of the drying cone, each to selectively vibrate within a frequency range that is efficacious for particular materials.

The object of this invention is the provision of methods and apparatus for minimizing, if not avoiding, undesired particulate accumulation at the downstream end portion of the drying cone for pulse combustor drying apparatus.

Other objects and advantages of the subject invention will be apparent from the following portions of this specification and from the appended drawings which illustrate, in accord with the mandate of the patent statutes, a presently preferred construction for a pulse combustor drying apparatus incorporating the principles of this invention.

Figure 1:
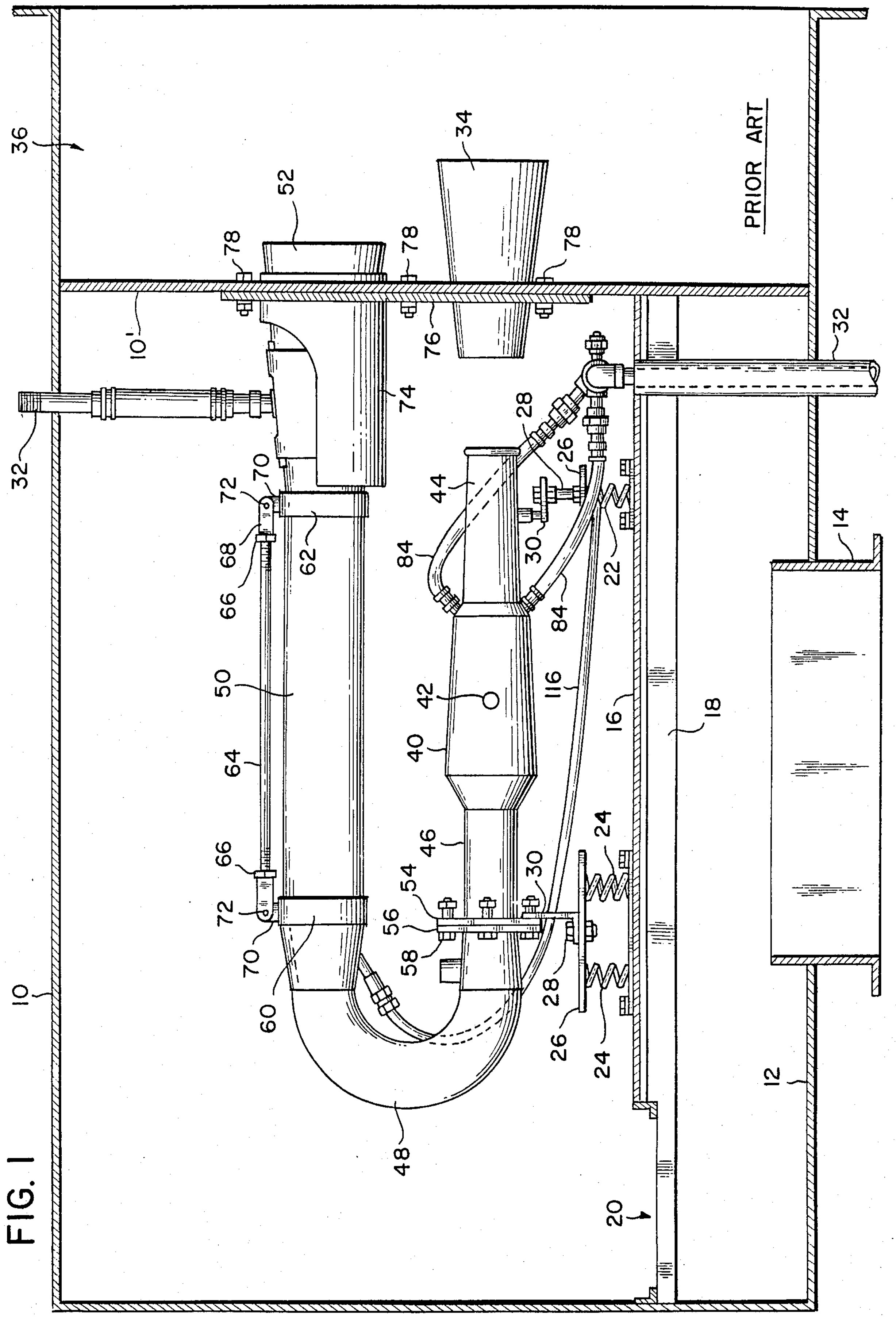
FIG. 1 is a schematic side elevation of a pulse combustor drying system.

Referring initially to FIG. 1, a conventional type of combustor dryer system as there depicted broadly includes an isolating enclosure 10, desirably of double walled sound-proof character, having an air inlet conduit 14 on the bottom wall 12 thereof. Disposed within the enclosure 10 is a platform 16 supported on beams 18 in uniform spaced relation to the enclosure bottom wall 12 and forming an inlet air plenum therebetween. The rearward end of the platform 16 terminates short of the rear wall of the enclosure 10 to provide an opening 20 for the passage of air upwardly from the air inlet conduit 14.

Also as illustrated, the pulse jet combustor is mounted in a resilient manner above the support platform 16 so as to cushion the platform and enclosure walls from vibrations incident to the operation of the combustor. Resilient mountings such as a front coil spring 22 and a rear pair of coil springs 24 extend upward from the platform 16, and support mounting plates 26 at their upper ends. Bolts 28 secured removably to the plates 26 serve to secure thereto brackets 30 which connect to and serve to support the front and rear portions of the combustor.

The pulse jet combustor includes a combustion chamber 40 of enlarged diameter provided with a spark plug 42 or other ignition means for igniting a combustible fuel-air mixture. Connected to the combustion chamber 40 is an air inlet conduit 44 which receives atmospheric air from within the enclosure 10, and a combustion gas outlet conduit generally shown at 46.

The combustion gas outlet conduit 46 communicates through an arcuate and generally U-shaped coupling section 48 with a tailpipe 50 which, in turn, communicates at its downstream or exhaust outlet end with a materials dehydration section 52.

In the illustrated embodiment, the combustion gas outlet conduit 46 of the combustion chamber section 40 is provided at its downstream or outlet end with a peripheral flange 54 arranged for removable connection to a corresponding flange 56 at the adjacent upstream or inlet end of the U-shaped coupling or transition section 48, as by means of a plurality of bolts 58. The downstream end of the coupling section 48 is fitted with an outer, forwardly projecting annular collar 60 dimensioned to freely receive therein the adjacent upstream end of the tailpipe section 50.

The downstream end of the tailpipe section 50 is, in similar manner, freely received within an enlarged collar 62 secured to and extending rearwardly of the upstream end of a dehydration section 52 in the form of a hollow truncated cone and generally called a "drying cone". To facilitate tailpipe replacement the collars 60 and 62 are interconnected by a turnbuckle assembly which includes an elongated threaded rod 64 received at its opposite ends in threaded nuts 66. Each nut is secured to a pair of laterally spaced lugs 68 which receive between them an ear 70 extending upwardly from the associated collar. Registering openings in the lugs and ears receive a pivot pin 72 for joining them together.

The dehydration section 52, which is of elongate frusto-conical shape and will be hereinafter identified as a dehydration or dyring cone, is supported in a saddle member 74 which is secured to and extends through a mounting plate 76. The mounting plate 76 is secured removably to a wall 10' of the enclosure, as by bolts 78. As is apparent, the dehydration cone 52 terminates within an adjacent large volume collector room 36 wherein the majority of the dried particulate settle out and are collected in any suitable manner. A duct collector or other conventional particulate collecting device is usually connected to the gas exhaust system for such collecting chamber or room 36 to effect recovery of substantially all of the dried particulates.

A wet product inlet conduit 32 is connected to the dehydration cone 52 for introduction of the wet product into the cone in a direction substantially perpendicular to the direction of movement of the high velocity gases of combustion passing through the tailpipe and exiting from the downstream end of the dehydration cone 52.

Combustible fuel, such as oil, gas, etc. is delivered to the combustion chamber 40 by one or more fuel supply lines, such as the two lines 84 illustrated, connected to the fuel inlet conduit 32.

The plate 76 supporting the dehydration cone saddle 74 also supports a so called "augmenter" in the form of a hollow truncated cone 34 disposed in spaced axial alignment with the air inlet portion 44 of the combustion chamber 40 and which also extends through the forward engine room wall 10'. In the described system, the augmenter 34 functions to direct the high velocity combustion gases emitted as back flow from the combustion chamber 40 and air inlet conduit 44 into the ajdacent collector room 36.

In the operation of the above described pulse combustor system, the combustor is activated by delivery of combustible fuel and air to the combustion chamber 40 where it is ignited by a spark from the plug 42. A wet product in the form of a slurry paste or moist particulate is fed, generally under pressure, through the material inlet conduit 32 from whence it enters the dehydration cone 52 in a direction substantially perpendicular to the direction of flow of high velocity combustion gases through the dehydration cone 52.

While, as noted earlier, operation of pulse combustor drying apparatus of the type described above has proved to be both efficient and economical in the drying of many diverse materials, a problem of partially dried material "sticking" to the drying cone surface and a concomitant rapid build up thereof and degradation of combustor operation has been encountered with certain materials. Such "sticking" and material build up always appears to occur in the "low velocity" area at the exit of the dehydration cone 52. While the reason for such sticking is not fully understood it appears to principally, if not universally, occur with wet particulate feeds of highly akaline character, such as, for example, with drilling muds, brewers yeast and certain synthetic resins. Not only does such material build up rapidly, often in the order of a fraction of an hour, with an equally rapid degradation of combustor operation, but the resulting accumulated product can often be of cement like character posing serious removal problems.

Figure 2:
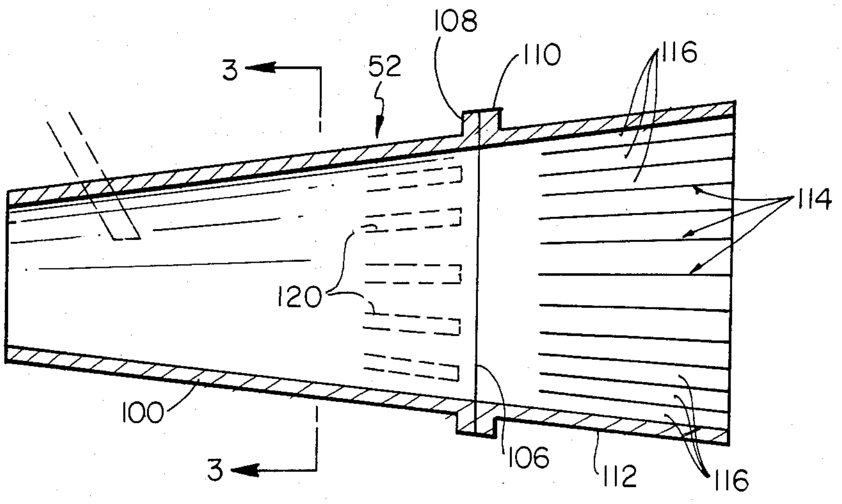
FIG. 2 is an enlarged vertical section of an improved construction for a dehydration cone construction incorporating the principles of this invention.
Figure 3:
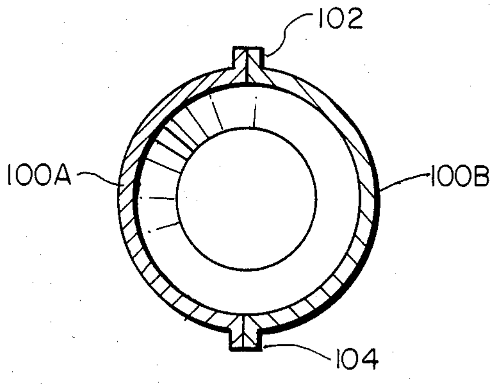
FIG. 3 is a vertical section as taken on the line 3—3 of FIG. 2.

FIGS. 2 and 3 are vertical sections through a presently preferred improved construction for a dehydration cone 52 that is adapted to minimize, if not effectively avoid, such sticking and material build up problems. As there shown the dehydration cone 52 includes a main portion 100 of frusto-conical configuration and formed of two mating half sections 100A and 100B secured together through longitudinal flanges 102, 104. The downstream end 106 of the main body portion contains a peripheral flange 108 to which is secured the peripheral flange 110 of a dehydration cone continuation member 112. As shown, the downstream end of the continuation member 112 is longitudinally slotted, as at 114, to provide a multiplicity of vibratable finger-like members 116 entirely around the periphery thereof.

In the operation of the subject device, the individual finger-like members 116 will independently vibrate and thus minimize, if not preclude, the sticking and build up of material on the inner surface thereof. While the mechanics of such build up avoidance are not clearly understood, it appears that the vibratory displacement of the fingers 116 and apparent localized disturbance of the exhaust gas flow patterns closely adjacent the surface thereof operate to preclude particulate "sticking" thereon.

Evidence available to date appears to indicate that the longer the slots 114, the lower is the frequency of finger element vibration. Such frequency-length relation permits a "tuning" of the continuation members 112 in accord with observed performance with particular materials for a particularly dimensioned pulse jet combustor drier. In light thereof the provision of separable continuation members not only permit ready replacement thereof when required, but also permit utilization of particular "fine tuned" continuation members 112 for particular products being handled.

As noted earlier, the sticking phenomenon appears to principally occur in the downstream surface of the dehydration cone and where the exhaust gas stream has reached its lower velocities, certain pulse jet combustor configurations or methods of operation may dictate the inclusion of similar vibratory fingers, such as fingers 120 indicated by the dotted lines in the downstream end of the main body portion 100 of a dehydration cone.

We claim:

1. In pulse jet combustor apparatus for the drying of particulate material of the type having a combustion chamber, an air inlet conduit connected to one end thereof a primary exhaust gas outlet conduit connected to the other end thereof, an elongate transition-tailpipe section connected to said primary exhaust conduit, and a frusto-conically shaped drying section of increasing diameter connected to the downstream end of said transition-tailpipe section having means for introducing particulate material to be dried therein, the improvement wherein the downstream portion of said drying section includes a plurality of longitudinal slits extending through the terminal end thereof forming a plurality of individually vibratable finger-like sections integrally connected to the drying section at a location spaced a predetermined distance upstream of said terminal end thereof.

2. The improved pulse jet combustor apparatus as set forth in claim 1 wherein said drying section includes an upstream main body portion and a separable downstream continuation portion that includes said individually vibratable finger-like sections.

3. The improved pulse jet combustor apparatus as set forth in claim 1 wherein said drying section is formed of a mated pair of separable longitudinally split half sections.

4. The improved pulse jet combustor apparatus as set forth in claim 1 wherein said drying section includes an upstream main body portion formed of a mated pair of separable longitudinally split half sections and a separable dowstream continuation portion removably securable to the terminal end of said main body portion and having said individually vibratable finger-like sections disposed at the downstream end thereof.

5. The improved pulse jet combustor apparatus as set forth in claim 1 wherein said finger-like sections are of uniform width and length and extend around the periphery of said drying section.

* * * * *